(12) United States Patent
Floyd et al.

(10) Patent No.: US 7,277,452 B2
(45) Date of Patent: Oct. 2, 2007

(54) SIGNALLING TDM CHANNEL CHANGES

(75) Inventors: Geoffrey Edward Floyd, Yelverton (GB); Timothy Michael Edmund Frost, Plymouth (GB); James F. Kosolowski, Woodlawn (CA); Martin Raymond Scott, Perranporth (GB)

(73) Assignee: Zarlink Semiconductor V.N. Inc., Irvine, CA (US)

( * ) Notice: Subject to any disclaimer, the term of this patent is extended or adjusted under 35 U.S.C. 154(b) by 1020 days.

(21) Appl. No.: 10/215,895

(22) Filed: Aug. 9, 2002

(65) Prior Publication Data

US 2003/0031205 A1   Feb. 13, 2003

(30) Foreign Application Priority Data

Aug. 11, 2001  (GB) ................. 0119619.5

(51) Int. Cl.
  *H04J 3/16*    (2006.01)
  *H04L 12/28*   (2006.01)
  *H04Q 7/00*    (2006.01)

(52) U.S. Cl. ............ 370/465; 370/314; 370/395.31; 370/389

(58) Field of Classification Search ........... 370/314, 370/352, 389, 395.31, 465, 466, 400, 252, 370/294, 384, 385
See application file for complete search history.

(56) References Cited

U.S. PATENT DOCUMENTS 6,128,283 A * 10/2000 Sabaa et al. ............... 370/236
6,621,833 B1 * 9/2003 Pierson, Jr. ................ 370/528
7,095,760 B1 * 8/2006 Parruck et al. ............. 370/539
7,113,521 B2 * 9/2006 Miller et al. ............... 370/474

FOREIGN PATENT DOCUMENTS

| EP | 0 837 579 A2 | 4/1998 |
| EP | 1 079 582 A1 | 2/2001 |
| GB | 2363295 | 12/2001 |
| WO | WO92/14327 | 8/1992 |
| WO | WO99/13619 | 3/1999 |
| WO | WO99/48258 | 9/1999 |
| WO | WO 01/97449 | 12/2001 |

* cited by examiner

*Primary Examiner*—Hanh Nguyen
(74) *Attorney, Agent, or Firm*—Thompson Hine, LLP

(57) ABSTRACT

A method of updating a lookup table associated with a TDM transmit unit which is coupled to a packet network to receive data therefrom, the lookup table mapping packet network contexts to TDM channels. The method includes priming a controller with data for updating the lookup table in advance of the receipt of packets containing data to which the update relates, incorporating a flag in each packet sent over the packet network to the TDM transmit unit, the flag being set to indicate whether or not a packet is the first packet to which the update relates, and detecting the setting of the flag in a first packet and in response updating the lookup table with the update data.

8 Claims, 4 Drawing Sheets

| Channel Number | Stream Number | Context Identifier | Normal flags | | Duplicate flags | | |
|---|---|---|---|---|---|---|---|
| | | | Valid channel flag | First channel flag | New Valid channel flag | New First channel flag | |
| 0 | 0 | 1 | Y | Y | Y | Y | |
| 0 | 1 | 1 | Y | N | Y | N | |
| 0 | 2 | 2 | N | N | Y | Y | New channel becomes first in context 2 |
| 0 | 3 | 1 | Y | N | Y | N | |
| 1 | 0 | 1 | Y | N | Y | N | |
| 1 | 1 | 2 | Y | Y | Y | N | No longer first channel in context 2 |
| 1 | 2 | 2 | Y | N | Y | N | |
| 1 | 3 | 1 | Y | N | Y | N | |
| 2 | 0 | 2 | Y | N | Y | N | |
| 2 | 1 | 2 | Y | N | Y | N | |
| 2 | 2 | 3 | N | N | N | N | |
| 2 | 3 | 2 | N | N | Y | N | New channel in context 2 |
| 3 | 0 | 4 | Y | Y | Y | Y | |
| 3 | 1 | 3 | N | N | N | N | |
| 3 | 2 | 4 | Y | N | Y | N | |
| 3 | 3 | 4 | Y | N | Y | N | |

| Channel Number | Stream Number | Context Identifier | Valid channel flag |
|---|---|---|---|
| 0 | 0 | 1 | Y |
| 0 | 1 | 1 | Y |
| 0 | 2 | 2 | Y |
| 0 | 3 | 1 | Y |
| 1 | 0 | 1 | Y |
| 1 | 1 | 2 | Y |
| 1 | 2 | 2 | Y |
| 1 | 3 | 1 | Y |
| 2 | 0 | 2 | Y |
| 2 | 1 | 2 | Y |
| 2 | 2 | 3 | N |
| 2 | 3 | 3 | N |
| 3 | 0 | 4 | Y |
| 3 | 1 | 3 | N |
| 3 | 2 | 4 | Y |
| 3 | 3 | 4 | Y |

Figure 3
PRIOR ART

| Channel Number | Stream Number | Context Identifier | Normal flags | | Duplicate flags | | |
|---|---|---|---|---|---|---|---|
| | | | Valid channel flag | First channel flag | New Valid channel flag | New First channel flag | |
| 0 | 0 | 1 | Y | Y | Y | Y | |
| 0 | 1 | 1 | Y | N | Y | N | |
| 0 | 2 | 2 | N | N | Y | Y | New channel becomes first in context 2 |
| 0 | 3 | 1 | Y | N | Y | N | |
| 1 | 0 | 1 | Y | Y | Y | N | No longer first channel in context 2 |
| 1 | 1 | 2 | Y | N | Y | N | |
| 1 | 2 | 2 | Y | N | Y | N | |
| 1 | 3 | 1 | Y | N | Y | N | |
| 2 | 0 | 2 | Y | N | Y | N | |
| 2 | 1 | 2 | N | N | N | N | |
| 2 | 2 | 3 | Y | N | Y | Y | New channel in context 2 |
| 2 | 3 | 2 | N | Y | Y | N | |
| 3 | 0 | 4 | Y | N | N | N | |
| 3 | 1 | 3 | N | N | Y | N | |
| 3 | 2 | 4 | Y | N | Y | N | |
| 3 | 3 | 4 | Y | N | Y | N | |

Figure 4

SIGNALLING TDM CHANNEL CHANGES

FIELD OF THE INVENTION

The present invention relates to the signalling of TDM channel changes across a packet network.

1. Background to the Invention

Time division multiplexing (TDM) is a mechanism commonly used for sharing resources on a communication link. Consider for example a single "wire" connecting multiple voice or data channels between call switches of a telephone network. The link is divided in time into successive frames of equal duration. Each frame is further subdivided in time into a sequence of slots, where each slot can accommodate 8 bits. The number of slots in a frame is determined by the data rate of the link and the duration of the frame (a typical number of slots is 32). Multiple channels are formed on a data stream by allocating respective slot numbers to channels (e.g. to provide channels 0 to 31). Thus, a first channel (CH0) is formed from the set of first slots in successive frames, a second channel (CH1) is formed from the set of second slots in successive frames, etc. A typical system may comprise 32 wires providing a total of 1024 data channels assuming 32 slots per frame. A further two wires provide slot and frame synchronisation signals respectively.

2. Related Art

Telephone network operators are keen to make use of packet networks to carry user traffic. For example, such packet networks may make use of the well known Internet Protocol (IP) to route data packets. In order to enable packet networks to interwork with conventional TDM networks, it will be necessary to provide a mechanism for efficiently converting between the TDM format and the packet format. FIG. 1 illustrates in very general terms a mechanism for facilitating the transparent flow of data between two TDM networks via a packet network. This mechanism must meet the following requirements:

Transmit constant bit rate TDM data across a packet network so that it can be reconstructed as TDM data at the far end;

Support the mapping of multiple TDM channels into a stream of packets (called a context) for transmission over a network;

Support multiple packet streams (contexts);

Maintain timeslot order when mapping TDM channels to and from context packets;

Each packet must contain one or more complete TDM frames of data; and

Packet transmission and reception must be aligned with the first TDM channel for the context after the TDM frame pulse.

FIG. 2 illustrates in more detail the TDM-packet conversion units of FIG. 1, each of which is under the control of a host control processor. Within a unit, a TDM receive block assembles incoming TDM data into packets. The receiver can handle several packet streams at a time, where each packet stream represents a virtual channel connection or "context" over the packet network. Each packet comprises a header containing a context identifier. Different contexts may terminate at the same or different TDM-packet conversions units (for example associated with different network operators). Assembled packets are passed to a packet transmit block and then to a LAN interface for sending over the packet network. Due to the large number of channels and high data rates which must be handled by the system, the conversion units are implemented using hardware.

A given context may carry several TDM channels. Packets are assembled sequentially. Data is placed into a packet as the data arrives at the (input) TDM port, maintaining channel and stream order (i.e. channel 0, stream 0 comes before channel 0, stream 1, which in turn comes before channel 1, stream 0). Each packet of a context must contain channel data belonging to one or more complete TDM frames—partial frames are not permitted—and each packet must start with the beginning of a new frame.

A TDM receive block makes use of a lookup table to map the stream and channel number from the TDM interface to a context number. The lookup table additionally comprises a "channel flag" field indicating whether or not individual channels on a given stream are in use. By way of example, a lookup table for a small TDM environment with four streams, each with four channels, is shown in FIG. 3. The host control processor writes data to the lookup table, and the receive block cycles through the entries in the table and, each time an entry having the channel flag set to valid (Y) is reached, the data (byte) carried by the corresponding channel and stream number is mapped to a packet of the corresponding context.

Packets at a TDM-packet conversion unit are received from the packet network by a TDM transmit block via a LAN interface and a packet receive unit. Each such transmit block has access to a lookup table having the same structure as that described for the receive block (i.e. as illustrated in FIG. 3). Of course the entries in the table will differ (contexts terminated at a given TDM receive block may originate at different TDM transmit blocks). The contents of packets belonging to contexts and received over the packet network are stored in a buffer (one for each context) of the TDM transmit block. The TDM transmit block again cycles through the lookup table and extracts data from the front of the various context buffers and transmits this on the appropriate TDM channels/streams.

SUMMARY

The lookup tables held by the TDM transmit and receive blocks are set up by host control processors of the TDM-packet conversion units as a result of negotiations between peer units over a signalling network (the signalling network may operate on top of the packet network used to carry context data, or may comprise a separate dedicated network). As a result of a negotiation between two peer host control processors, it may for example be necessary to modify a lookup table held by a TDM transmit block. The host control processor associated with the TDM transmit block will know which changes need to be made to the lookup table. However, due to the unpredictability of the transmission time over a packet network, the host control processor will not know exactly when the lookup table associated with the new processor should be updated. If the processor updates the lookup table of the TDM transmit block at the wrong time, then there is a possibility that data will not reach the correct party and/or will be sent to an incorrect party.

It is an object of the present invention to overcome the problem noted in the previous paragraph. It is an object of the present invention to synchronise the updating of the lookup table in the TDM transmit block to the arrival of packets over the packet network.

According to a first aspect of the present invention there is provided a method of updating a lookup table associated with a TDM transmit unit which is coupled to a packet network to receive data therefrom, the lookup table mapping packet network contexts to TDM channels, the method including:

priming a controller with data for updating the lookup table in advance of the receipt of packets containing data to which the update relates;

incorporating a flag in each packet sent over the packet network to the TDM transmit unit, the flag being set to indicate whether or not a packet is the first packet to which the update relates; and detecting the setting of the flag in a first packet and in response updating the lookup table with the update data.

The flag used to trigger the updating of the lookup table is preferably located in a header of the packets.

Preferably, the lookup table comprises a valid channel flag field which, for each entry of the table, indicates whether the corresponding TDM channel is valid (active) or invalid (inactive). The update data identifies those channel flags which are to be changed upon receipt of a packet containing the update trigger flag.

More preferably, the lookup table comprises a first channel flag field which indicates, for each entry in the table, whether or not the entry corresponds to the first TDM channel for the identified context. Use of this flag enables context packet data to be synchronised with TDM frames. In addition to identifying channel flags to be changed, the update data identifies changes to be made to the first channel flags.

Preferably, following the priming of the controller with the update data, the controller stores the data in new valid channel and first channel fields of the lookup table. When the first packet is received, the TDM transmit unit steps through the entries in the table and acts upon the new valid channel and first channel field flags, replacing the old valid channel and first channel field flags with the new flags where appropriate.

According to a second aspect of the present invention there is provided a method of updating a lookup table associated with a TDM transmit or receive block coupled to a packet network and a TDM network, the lookup table containing an entry for each TDM channel on which data can be transmitted or received and each entry comprising an associated context, a valid channel flag indicating whether the channel is valid or invalid, and a first channel flag indicating whether the channel is the first channel allocated to the associated context in a TDM frame, the lookup table comprising a new valid channel flag field and a new first channel flag, the method comprising:

when the entries in the lookup table are to be updated for a given context, setting the new valid channel flags and the new first channel flags to the updated values for these entries; and whenever the TDM transmit or receive block encounters an entry for the updated context, making a decision regarding the transmission of data for the corresponding channel based upon the new flags, and replacing the valid channel flag and the first channel flag with the respective new flags.

The second aspect of the invention avoids the need to update all of the valid channel and first channel flags at the same time.

Preferably, said steps of making a decision regarding the transmission of data for the corresponding channel based upon the new flags, and replacing the valid channel flag and the first channel flag with the respective new flags, are carried out following the receipt of a first packet belonging to the updated context. This first packet may be identified by the setting of a flag in the packet (e.g. in the packet header).

BRIEF DESCRIPTION OF THE DRAWINGS

FIG. 3 illustrates a lookup table which might be used by the TDM-packet conversion units of FIG. 1; and FIG. 4 illustrates a modified lookup table.

DETAILED DESCRIPTION OF CERTAIN EMBODIMENTS

Figure 1:
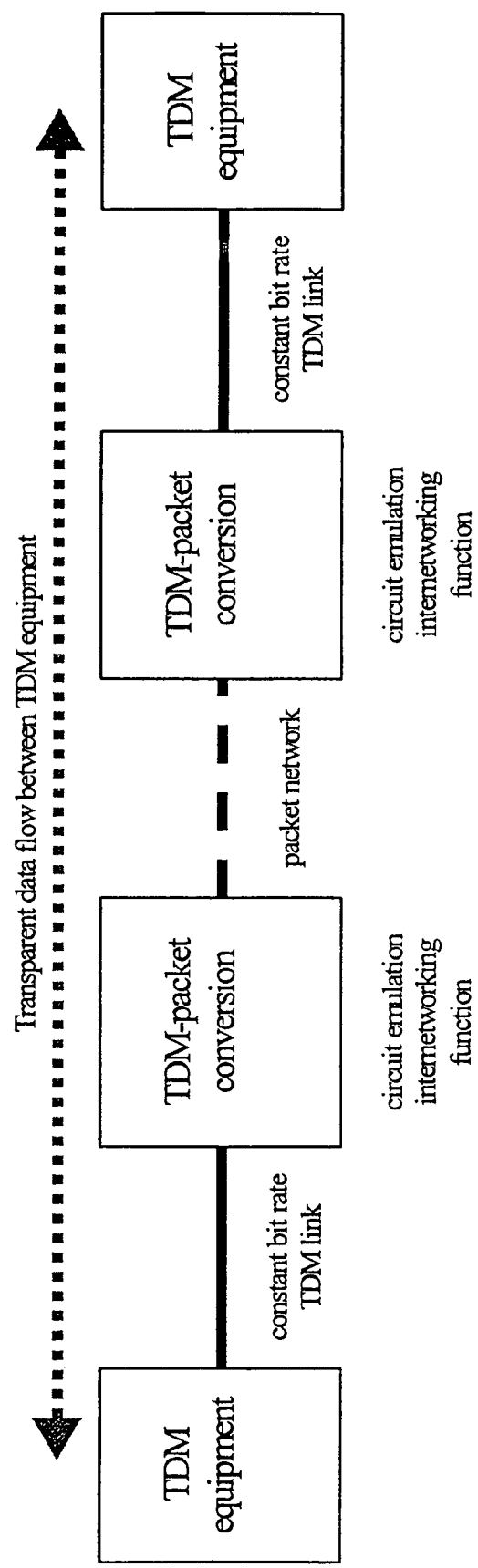
FIG. 1 illustrates schematically a system for transporting TDM data across a packet network.
Figure 2:
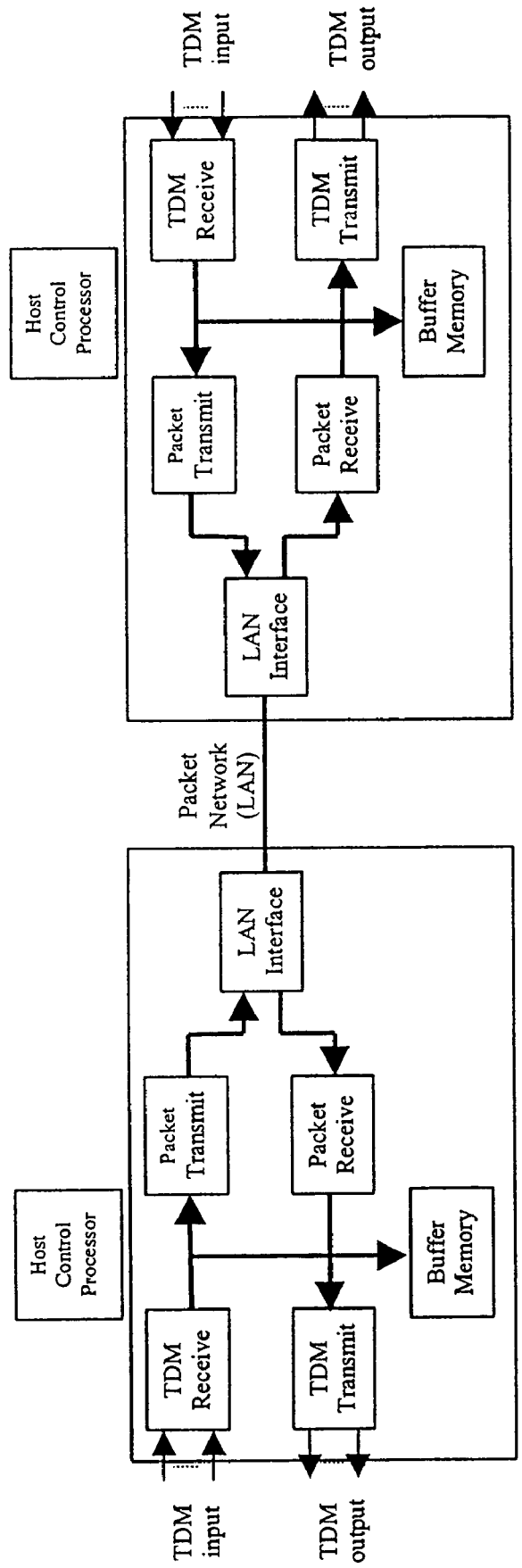
FIG. 2 illustrates in more detail TDM-packet conversion units of the system of FIG. 1.

A typical TDM trunk line is able to provide 32 channels on each of 32 wires or streams, i.e. a total of 1024 channels. In order to transport the channels over a data network, channels are mapped to contexts as described above. For transmission in a given direction over the packet network, the transmitting entity maintains a first lookup table mapping channels to contexts, whilst the receiving entity maintains a second lookup table mapping contexts to channels (the tables illustrated in FIGS. 3 and 4 include the channel and stream numbers—these are not however included in the tables used in practice but rather represent the indices for accessing the table). The lookup tables are constructed as a result of negotiations carried out over a signalling network which may make use of the packet network or may comprise a separate, dedicated signalling network. The tables can be updated dynamically, particularly to set the channel flag which indicates whether a given context is in use. It will be appreciated that for a transmitting entity, the contexts contained in the lookup table may "terminate" at different peer receiving entities, whilst for a receiving entity, the contexts contained in the lookup table may originate at different transmitting entities.

The lookup tables provided at both the transmitting and receiving entities contain an additional field as compared to the lookup tables which are conventionally provided. This field contains a flag which indicates whether or not a context channel corresponds to a first TDM channel (allocated to that context). The modified table is illustrated in FIG. 4, from which it will be seen that the flag is set for channel number 0/stream 0 (context 1), channel number 0/stream 2 (context 2), and channel number 3/stream number 0 (context 4). (As all of the channels of context 3 are inactive, no first channel flag is set for context 3.). In addition, each entry in a lookup table comprises "duplicate" valid channel and first channel flags.

Considering firstly a TDM receive block, data received over the TDM link is buffered, with one buffer per stream, and the TDM receive block cycles through the entries in the table. The lookup table is configured according to the current conditions. If an entry in the table contains a valid channel flag, data is taken from the buffer and is placed in a packet associated with the identified context. If an entry does not contain a valid channel flag, the entry is skipped. Data is therefore taken from the stream buffers on a round-robin basis, with a buffer being skipped if the corresponding valid channel flag is not set. At a TDM transmit block, packets are received over the packet network, with the packets being processed and the user data placed in buffers, one for each context. The transmit block cycles through the table, checking first that the valid channel flag is set. If it is set, data is extracted from the buffer associated with the identified context and is sent on the indicated channel on a TDM stream.

Consider now what happens if the settings of the valid channel flags in the lookup table of a TDM receive block for a given context are changed, e.g. two new channels are added to a context. Just prior to the change, the duplicate flag fields are set with the updated flag values. This is illustrated in FIG. 4. When the change is to be made, the host control processor instructs the TDM receive block to start a new packet with the updated channel settings for the context in question. In place of the "current" flags, the receive block uses the duplicate flags to create the packet. As the receive block cycles through the entries in the table, each time it encounters an entry for the updated context, it checks the setting of the new duplicate valid channel flag. If this flag is set, it then checks the setting of the duplicate first channel flag. If this flag is set, then data will be extracted from the appropriate stream buffer and added to the new packet. If the flag is not set, the receive block will not add data into the packet. The duplicate flags are then copied across to the current flags. The cycle continues, copying the duplicate flags across to the current flags as each entry for the updated context is encountered. If the first encountered entry did not have the first channel flag set, the TDM receive block will continue until an entry is encountered for the updated context which has the (duplicate) first channel flag set, at which point it will start to extract data from the appropriate stream buffer for inclusion in the new packet (entries for other contexts will be dealt with independently, as they are encountered in the cycle).

Whenever changes are made to the lookup table of the TDM receive block, consequential changes will generally be required in the lookup tables of the peer TDM transmit block(s). In order to synchronise the changes at the transmit block, whenever an update occurs at the receive block an update flag is set in a header or other known location of the first packet to which the change applies. This flag, referred to as a "context update" flag, may for example be contained in the protocol port number field in the UDP header.

As a result of the signalling negotiations between peer host control processors, the host control processor is aware of the next update which will be required to the associated lookup table. However, the processor does not update the lookup table immediately. Rather, it sets the flags of the duplicate fields to the new values as described above for the lookup table associated with the transmit block. When a packet is received, the setting of the context update flag is determined. If this flag is not set, the TDM transmit block ignores the duplicate flags and acts only on the valid channel flag (and first channel flag if synchronisation is required). When a packet is received which has the context update flag set, the process continues as described above, with the duplicate valid channel and first channel flags being analysed to determine whether data should be transmitted, and the flags being copied across to the current flags.

As an alternative to setting the flag in the first packet to which the update relates, the previous flag setting may be toggled. The flag remains in this state until a further update is required. The TDM transmit entity detects a change in the flag setting and commences the update procedure. This approach has the advantage that if the first packet is lost in the packet network, receipt of the second packet will still trigger the table update procedure as the TDM transmit entity will still detect a change in the flag state.

The skilled person will appreciate that in order to efficiently handle 1024 (or more) channels, the TDM transmit and receive blocks will generally be implemented in hardware with a minimum of software. It will be further appreciated that an operation to update all flags in a lookup table at the same time is a computationally expensive operation. Consider a 1024 channel system. All channels must be processed within one time frame, typically 125 us. For a system clock running at 66 MHz (66 MHz equates to a clock period of about 15 ns and this divides into 125 us 8250 times, whilst 8250/1024 equals approx 8), each channel must be processed within 8 clock cycles. It will take the control processor (or internal hardware) a couple of cycles to change each entry in the lookup table. So if 500 channels are mapped into a packet context it will take about 1000 cycles to update the table. However, only 8 cycles are available to complete the processing of each channel. The embodiment of the invention described above updates the lookup table as the channels are processed, so that at most only one entry needs to be updated every 8 clock cycles.

It will be appreciated by the person of skill in the art that various modifications may be made to the embodiment described above without departing from the scope of the present invention. The invention is applicable to systems with any number of channels and streams including single stream/multiple channel systems and multiple stream/single channel systems. The TDM-packet conversion units may be implemented in software rather than hardware, or by a combination of hardware and software.

What is claimed is:
1. A method of updating a first look-up table associated with a TDM-packet conversion function and a second look-up table associated with a corresponding packet-TDM conversion function which are coupled together via a packet network, each look-up table mapping one or more TDM channels onto a packet network flow, the method comprising:
- priming a controller with data for updating the first and second look-up tables in advance of the transmission of packets from the TDM-packet conversion function to the packet-TDM conversion function containing data to which the update relates;
- incorporating a flag in each packet sent over the packet network from the TDM-packet to the packet-TDM conversion function, the flag being set to indicate whether or not a packet is the first packet to which the update relates; and
- detecting the setting of said flag in said first packet and in response updating the second look-up table with the update data.

2. A method according to claim 1, wherein the flag used to trigger the updating of the second look-up table is located in a header of the packets.

3. A method according to claim 1, wherein the look-up tables comprise a valid channel flag field which, for each entry of the table, indicates whether the corresponding TDM channel is valid or invalid, and wherein said update data identifies those channel flags which are to be changed upon receipt of a packet containing the update trigger flag.

4. A method according to claim 1, wherein the look-up tables comprise a first channel flag field which indicates, for each entry in the table, whether or not the entry corresponds to the first TDM channel for the identified context.

5. A method according to claim 4, wherein following the priming of the controller with the update data, the controller stores the data in new valid channel and first channel fields of the lookup table, and when said first packet is received, the TDM transmit unit steps through the entries in the table and acts upon the new valid channel and first channel field flags, replacing the old valid channel and first channel field flags with the new flags where appropriate.

6. A method according to claim 1, wherein said flag contained in each packet is toggled in the first packet to which the update relates.

7. A method of updating a lookup table associated with a TDM transmit or receive block coupled to a packet network and a TDM network, the lookup table containing an entry for each TDM channel on which data can be transmitted or received and each entry comprising an associated context, a valid channel flag indicating whether the channel is valid or invalid, and a first channel flag indicating whether the channel is the first channel allocated to the associated context in a TDM frame, the lookup table comprising a new valid channel flag field and a new first channel flag, the method comprising:
- when the entries in the lookup table are to be updated for a given context, setting the new valid channel flags and the new first channel flags to the updated values for these entries; and
- whenever the TDM transmit or receive block encounters an entry for the updated context, making a decision regarding the transmission of data for the corresponding channel based upon the new flags, and replacing the valid channel flag and the first channel flag with the respective new flags.

8. A method according to claim 7, wherein said steps of making a decision regarding the transmission of data for the corresponding channel based upon the new flags, and replacing the valid channel flag and the first channel flag with the respective new flags, are carried out following the receipt of a first packet belonging to the updated context.

* * * * *